United States Patent
Weddle et al.

(10) Patent No.: US 9,443,401 B2
(45) Date of Patent: Sep. 13, 2016

(54) AUTOMATIC REMOTE SENSING AND HAPTIC CONVERSION SYSTEM

(71) Applicant: Immersion Corporation, San Jose, CA (US)

(72) Inventors: Amaya Becvar Weddle, San Jose, CA (US); Danny Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 127 days.

(21) Appl. No.: 14/019,606

(22) Filed: Sep. 6, 2013

(65) Prior Publication Data

US 2015/0070144 A1   Mar. 12, 2015

(51) Int. Cl.
*G08B 6/00* (2006.01)
*G06F 3/01* (2006.01)

(52) U.S. Cl.
CPC ............. *G08B 6/00* (2013.01); *G06F 3/016* (2013.01)

(58) Field of Classification Search
CPC .. G06F 3/016; G06F 3/03543; G06F 1/1616; G06F 1/1626; G06F 1/169; G06F 3/01; G06F 3/011; G06F 3/0338; G06F 3/03545; G06F 3/03547; G06F 3/0362; G06F 3/167; A61N 1/3601; A61N 1/36014
USPC ............. 340/995.19, 436, 407.1, 407.2, 669; 345/156, 173, 184, 157, 161, 167, 174, 345/177
See application file for complete search history.

(56) References Cited

U.S. PATENT DOCUMENTS

| | | | |
|---|---|---|---|
| 5,035,242 A | 7/1991 | Franklin et al. | |
| 5,699,284 A * | 12/1997 | Muramatsu | G06F 17/5018 702/130 |
| 6,384,814 B1 * | 5/2002 | Kobayashi | G06F 3/0433 345/173 |
| 7,106,305 B2 * | 9/2006 | Rosenberg | G06F 3/016 345/168 |
| 7,159,008 B1 * | 1/2007 | Wies et al. | 709/206 |
| 7,688,310 B2 * | 3/2010 | Rosenberg | G06F 3/016 341/21 |
| 7,979,146 B2 | 7/2011 | Ullrich et al. | |
| 8,000,825 B2 | 8/2011 | Ullrich et al. | |
| 8,315,652 B2 * | 11/2012 | Grant et al. | 455/466 |
| 8,325,144 B1 * | 12/2012 | Tierling et al. | 345/173 |
| 8,378,964 B2 | 2/2013 | Ullrich et al. | |
| 8,380,561 B1 * | 2/2013 | Viegas et al. | 705/7.38 |
| 8,436,839 B2 * | 5/2013 | Takashima | G06F 3/016 345/184 |
| 8,743,057 B2 * | 6/2014 | Rosenberg | G06F 3/016 345/168 |
| 8,754,757 B1 * | 6/2014 | Ullrich | G06F 3/016 340/407.1 |
| 8,783,264 B2 * | 7/2014 | Levendowski et al. | 128/871 |
| 8,874,345 B2 * | 10/2014 | Nandedkar | G06F 17/00 184/3.1 |
| 2002/0033795 A1 * | 3/2002 | Shahoian et al. | 345/156 |
| 2003/0018835 A1 * | 1/2003 | Nonaka | G06F 3/016 710/5 |

(Continued)

FOREIGN PATENT DOCUMENTS

EP    2629176 A1    8/2013

OTHER PUBLICATIONS

Henry Da Costa, U.S. Appl. No. 13/439,241, filed Apr. 4, 2012.

(Continued)

*Primary Examiner* — Fekadeselassie Girma
(74) *Attorney, Agent, or Firm* — Miles & Stockbridge P.C.

(57) ABSTRACT

A system is provided that automatically converts an input into one or more haptic effects in near real-time. The system senses the input in near real-time. The system automatically converts the sensed input into one or more haptic signals in near real-time. The system generates the one or more haptic effects based on the one or more haptic signals.

22 Claims, 3 Drawing Sheets

(56) References Cited

U.S. PATENT DOCUMENTS

| | | | |
|---|---|---|---|
| 2003/0068053 A1* | 4/2003 | Chu | 381/118 |
| 2004/0130526 A1* | 7/2004 | Rosenberg | 345/156 |
| 2005/0134561 A1* | 6/2005 | Tierling et al. | 345/156 |
| 2005/0156892 A1* | 7/2005 | Grant | 345/167 |
| 2006/0017691 A1* | 1/2006 | Cruz-Hernandez et al. | 345/156 |
| 2006/0066569 A1* | 3/2006 | Eid et al. | 345/156 |
| 2006/0143342 A1* | 6/2006 | Kim | G06F 3/016 710/5 |
| 2006/0267949 A1* | 11/2006 | Rosenberg | G06F 3/016 345/168 |
| 2006/0284849 A1* | 12/2006 | Grant et al. | 345/173 |
| 2007/0005835 A1* | 1/2007 | Grant et al. | 710/62 |
| 2007/0016425 A1 | 1/2007 | Ward | |
| 2007/0057913 A1* | 3/2007 | Eid et al. | 345/156 |
| 2007/0182711 A1* | 8/2007 | Grant et al. | 345/156 |
| 2007/0236449 A1* | 10/2007 | Lacroix et al. | 345/156 |
| 2007/0242040 A1* | 10/2007 | Ullrich et al. | 345/157 |
| 2007/0279401 A1* | 12/2007 | Ramstein et al. | 345/184 |
| 2008/0045804 A1* | 2/2008 | Williams | 600/300 |
| 2008/0122796 A1* | 5/2008 | Jobs et al. | 345/173 |
| 2008/0159569 A1 | 7/2008 | Hansen | |
| 2008/0296072 A1* | 12/2008 | Takashima | G06F 3/016 178/18.01 |
| 2009/0021473 A1* | 1/2009 | Grant et al. | 345/156 |
| 2009/0064031 A1* | 3/2009 | Bull et al. | 715/784 |
| 2009/0085878 A1* | 4/2009 | Heubel et al. | 345/173 |
| 2009/0106655 A1* | 4/2009 | Grant et al. | 715/702 |
| 2009/0231271 A1* | 9/2009 | Heubel et al. | 345/156 |
| 2009/0231276 A1* | 9/2009 | Ullrich et al. | 345/157 |
| 2009/0312817 A1 | 12/2009 | Hogle et al. | |
| 2009/0313542 A1* | 12/2009 | Cruz-Hernandez et al. | 715/702 |
| 2009/0325645 A1* | 12/2009 | Bang et al. | 455/566 |
| 2010/0004033 A1* | 1/2010 | Choe et al. | 455/567 |
| 2010/0013653 A1* | 1/2010 | Birnbaum et al. | 340/669 |
| 2010/0116562 A1* | 5/2010 | Cruz-Hernandez et al. | 178/18.03 |
| 2010/0152586 A1* | 6/2010 | Grant et al. | 600/454 |
| 2010/0179423 A1* | 7/2010 | Ramstein et al. | 600/437 |
| 2010/0179587 A1* | 7/2010 | Grant et al. | 606/205 |
| 2010/0182241 A1* | 7/2010 | Rosenberg | G06F 3/016 345/168 |
| 2010/0245232 A1* | 9/2010 | Birnbaum et al. | 345/156 |
| 2011/0025609 A1* | 2/2011 | Modarres et al. | 345/173 |
| 2011/0061017 A1* | 3/2011 | Ullrich | G06F 3/016 715/780 |
| 2011/0202155 A1 | 8/2011 | Ullrich et al. | |
| 2011/0215913 A1 | 9/2011 | Ullrich et al. | |
| 2011/0234517 A1* | 9/2011 | Ando | G06F 3/03547 345/173 |
| 2011/0264491 A1* | 10/2011 | Birnbaum et al. | 705/14.4 |
| 2011/0285637 A1* | 11/2011 | Karkkainen | 345/173 |
| 2012/0200520 A1* | 8/2012 | Harris | 345/173 |
| 2012/0206246 A1 | 8/2012 | Cruz-Hernandez et al. | |
| 2012/0206247 A1* | 8/2012 | Bhatia et al. | 340/407.1 |
| 2012/0286944 A1* | 11/2012 | Forutanpour et al. | 340/407.1 |
| 2012/0306631 A1 | 12/2012 | Hughes | |
| 2012/0327006 A1* | 12/2012 | Israr et al. | 345/173 |
| 2013/0050062 A1* | 2/2013 | Kim | G06F 3/016 345/1.3 |
| 2013/0113715 A1* | 5/2013 | Grant et al. | 345/173 |
| 2013/0131851 A1 | 5/2013 | Ullrich et al. | |
| 2013/0147971 A1* | 6/2013 | Flynn et al. | 348/207.1 |
| 2013/0194219 A1* | 8/2013 | Modarres et al. | 345/173 |
| 2013/0207918 A1* | 8/2013 | Kono et al. | 345/173 |
| 2013/0222311 A1* | 8/2013 | Pesonen | 345/173 |
| 2013/0227411 A1* | 8/2013 | Das et al. | 715/702 |
| 2013/0265286 A1* | 10/2013 | Da Costa et al. | 345/177 |
| 2013/0268172 A1* | 10/2013 | Nandedkar | G06F 17/00 701/70 |
| 2013/0307786 A1* | 11/2013 | Heubel | 345/173 |
| 2013/0311881 A1* | 11/2013 | Birnbaum et al. | 715/702 |
| 2014/0035736 A1* | 2/2014 | Weddle et al. | 340/407.2 |
| 2014/0062682 A1* | 3/2014 | Birnbaum et al. | 340/407.2 |
| 2014/0139450 A1* | 5/2014 | Levesque et al. | 345/173 |
| 2014/0139451 A1* | 5/2014 | Levesque et al. | 345/157 |
| 2014/0176415 A1* | 6/2014 | Buuck et al. | 345/156 |
| 2014/0253302 A1* | 9/2014 | Levesque et al. | 340/407.1 |
| 2014/0256438 A1* | 9/2014 | Grant et al. | 463/36 |
| 2014/0266647 A1* | 9/2014 | Visitacion et al. | 340/407.1 |
| 2014/0267069 A1* | 9/2014 | Dionne et al. | 345/173 |
| 2014/0267076 A1* | 9/2014 | Birnbaum et al. | 345/173 |
| 2014/0267911 A1* | 9/2014 | Grant et al. | 348/563 |
| 2014/0315642 A1* | 10/2014 | Grant et al. | 463/38 |
| 2014/0320393 A1* | 10/2014 | Modarres et al. | 345/156 |
| 2014/0320436 A1* | 10/2014 | Modarres et al. | 345/173 |
| 2014/0340209 A1* | 11/2014 | Lacroix et al. | 340/407.2 |
| 2014/0362014 A1* | 12/2014 | Ullrich et al. | 345/173 |
| 2015/0009168 A1* | 1/2015 | Levesque et al. | 345/174 |
| 2015/0042573 A1* | 2/2015 | Grant et al. | 345/173 |
| 2015/0054768 A1* | 2/2015 | Grant et al. | 345/173 |
| 2015/0070144 A1* | 3/2015 | Weddle et al. | 340/407.1 |
| 2015/0177840 A1* | 6/2015 | Kankaanpaa | G06F 3/017 715/863 |

OTHER PUBLICATIONS

Satvir Singh Bhatia, U.S. Appl. No. 13/661,140, filed Oct. 26, 2012.
Juan Manuel Cruz-Hernandez, U.S. Appl. No. 13/767,129, filed Feb. 14, 2013.
Christopher J. Ullrich, U.S. Appl. No. 13/785,166, filed Mar. 5, 2013.
Christopher J. Ullrich, U.S. Appl. No. 13/788,487, filed Mar. 7, 2013.
Juan Manuel Cruz-Hernandez, U.S. Appl. No. 13/803,778, filed Mar. 14, 2013.
Juan Manuel Cruz-Hernandez, U.S. Appl. No. 13/799,059, filed Mar. 13, 2013.
Robert Lacroix, U.S. Appl. No. 13/804,692, filed Mar. 14, 2013.
Jamal Saboune et al., U.S. Appl. No. 14/020,502 filed Sep. 6, 2013.
Jamal Saboune et al., U.S. Appl. No. 14/020,461 filed Sep. 6, 2013.

* cited by examiner

AUTOMATIC REMOTE SENSING AND HAPTIC CONVERSION SYSTEM

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Devices can be configured to coordinate the output of haptic effects with the output of other content, such as audio, so that the haptic effects are incorporated into the other content. For example, in a gaming context, when a game is developed, an audio effect developer can develop audio effects that are associated with the game and represent an action occurring within the game, such as machine gun fire, explosions, or car crashes. In another context, audio input, or other types of real-world input, can be captured by a microphone, or other type of sensor. A haptic effect developer can subsequently author a haptic effect for the device, and the device can be configured to output the haptic effect along with the other content. However, such a process is generally not instantaneous, as the process requires a time period for the haptic effect developer to analyze the audio input, or other input, and author an appropriate haptic effect that can be coordinated with the audio input, or other input.

SUMMARY

One embodiment is a system that can automatically convert an input into one or more haptic effects in near real-time. The system can sense the input in near real-time. The system can further automatically convert the sensed input into one or more haptic signals in near real-time. The system can further generate one or more haptic effects based on the one or more haptic signals.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
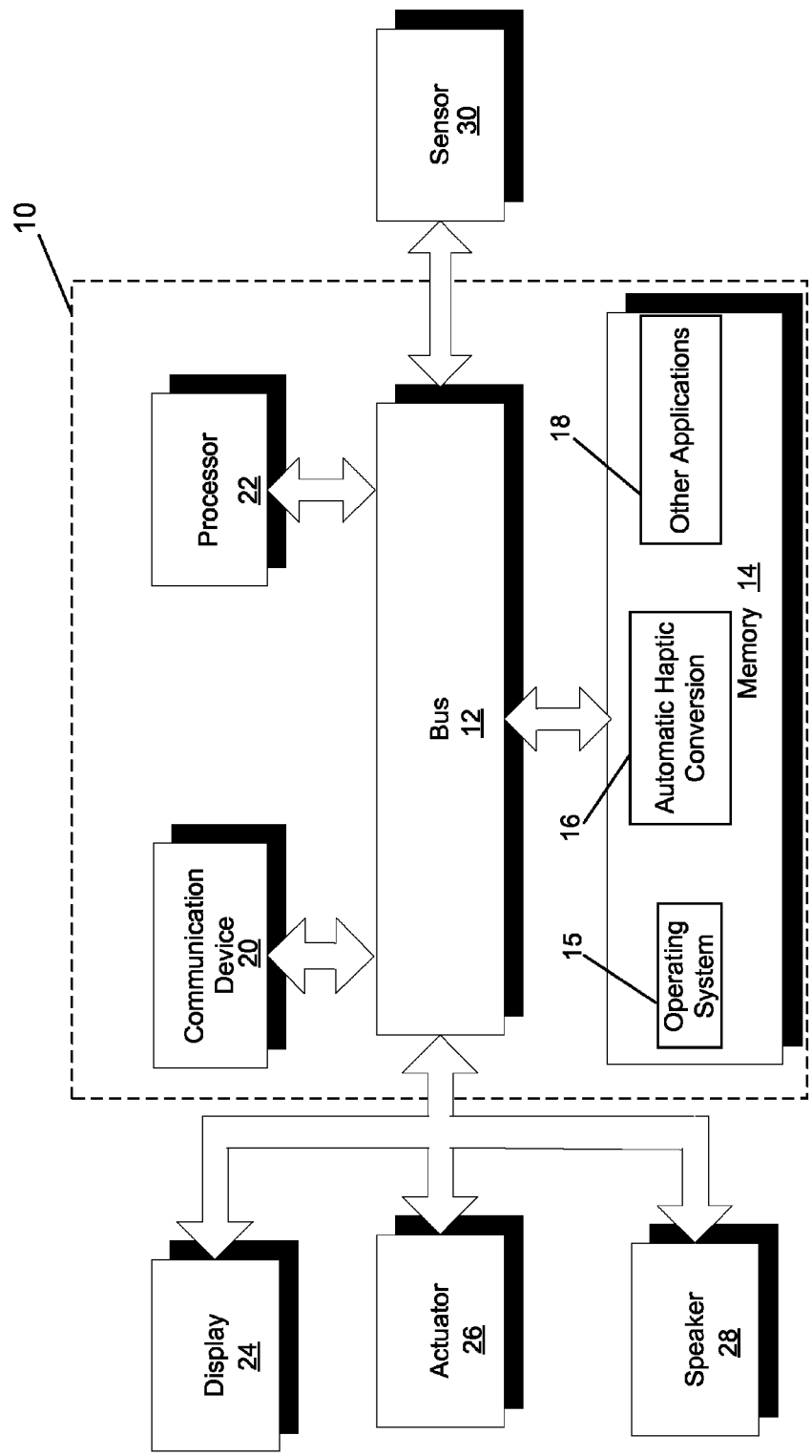
FIG. 1 illustrates a block diagram of a system in accordance with one embodiment of the invention.

One embodiment is a system that can include a haptic device that delivers haptic feedback converted from an input, such as an audio signal, that can be sensed at a remote location by a sensor, such as a microphone or camera, or an array of microphones or cameras, and transmitted wirelessly to the haptic device. The haptic feedback can be output within the haptic device by a haptic output device or a set of haptic output devices, such as an actuator or a set of actuators, which can be programmed to deliver haptic effects that are generated based on the input and transmitted in near real-time. More specifically, the system can convert the sensed input into one or more haptic signals in near real-time, and the system can further send the one or more haptic signals to the haptic output device(s) to generate the one or more haptic effects. In one embodiment, the sensor can be configured to filter out and deliver only specific frequency bands, features, or other characteristics of the input to the haptic device. Further, according to the embodiment, the haptic output device(s) within the haptic device can be tuned to extract different frequency bands, features, or other characteristics of the input, controlling and/or enhancing the haptic feedback in a way to modulate the attention of the user. Thus, the user can experience haptic feedback that accentuates certain frequency bands, features, or other characteristics of the input that is sensed at the remote location. In one embodiment, the haptic device can be a wearable haptic device.

As understood by one of ordinary skill in the art, "near real-time," in telecommunications and computing, refers to a time delay introduced by automated data processing or network transmission. Thus, in an embodiment where the input is sensed by the system in near real-time, the input is sensed at the time the input is generated by a remote source, in addition to any time delay associated with sensing the input. Further, in an embodiment where the system generates one or more haptic effects based on the sensed input in near real-time, the system can convert the sensed input into one or more haptic signals used to generate the one or more haptic effects at the time the sensed input is received by the system, in addition to any time delay associated with converting the sensed input into the one or more haptic signals. In certain embodiments, there can be no time delay, and thus, in these embodiments, "near real-time" can be identical to "real-time."

Such a system can have several applications, according to certain embodiments of the invention. For example, the system can be utilized in a military scenario, where the system can allow for stealth remote monitoring of specific input, such as specific auditory signals, video signals, or other type of sensed input, in near real-time, where the system can deliver the monitored input regarding specific events at a remote location using a haptic output, and where the haptic output can be delivered in a completely silent manner. The haptic output may also deliver enough descriptive information to service in an "alert" capacity. More specifically, the haptic output can inform an individual of specific kinds of activity that are taking place, such as human speech events, vehicle activity or gunfire.

As another example, the system can be utilized in a scientific scenario, where the system can allow for scientists to do remote monitoring of biological or geological events having a distinctive input, such as a distinct audio signal, video signal, or other type of sensed input. For example, the system can allow an ornithologist to use a remote microphone to monitor for a distinct bird call that can be transmitted, converted into a haptic output, and played on a haptic device, such as a wearable haptic device. Thus, the ornithologist can be informed that a certain species of bird has returned to a nesting location, or some other instance of a certain behavior at a certain time.

As yet another example, the system can be utilized in an "immersive" or entertainment scenario, where the system can allow for real-time information, such as auditory information, to be ported to a viewer and converted to one or more haptic effects. For example, in a motocross race, a viewer can feel what a racer is experiencing in the event in near real-time.

FIG. 1 illustrates a block diagram of a system 10 in accordance with one embodiment of the invention. In one embodiment, system 10 is part of a mobile device, and system 10 provides an automatic haptic conversion functionality for the mobile device. In another embodiment, system 10 is part of a wearable device, and system 10 provides an automatic haptic conversion functionality for the wearable device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides the automatic haptic conversion functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include an automatic haptic conversion module 16 that automatically converts an input into one or more haptic effects, as disclosed in more detail below. In certain embodiments, automatic haptic conversion module 16 can comprise a plurality of modules, where each module provides specific individual functionality for automatically converting an input into one or more haptic effects. System 10 will typically include one or more additional application modules 18 to include additional functionality, such as Integrator™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electromagnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic signals to that device through communication device 20.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker. In alternate embodiments, system 10 can include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 30 can further be configured to convert the detected energy, or other physical property, into an electrical signal, or any signal that represents virtual sensor information. Sensor 30 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense $CPS^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor. In alternate embodiments, system 10 can include one or more additional sensors, in addition to sensor 30 (not illustrated in FIG. 1). In some of these embodiments, sensor 30 and the one or more additional sensors may be part of a sensor array, or some other type of collection of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device can then send the converted signal to system 10 through communication device 20.

Figure 2:
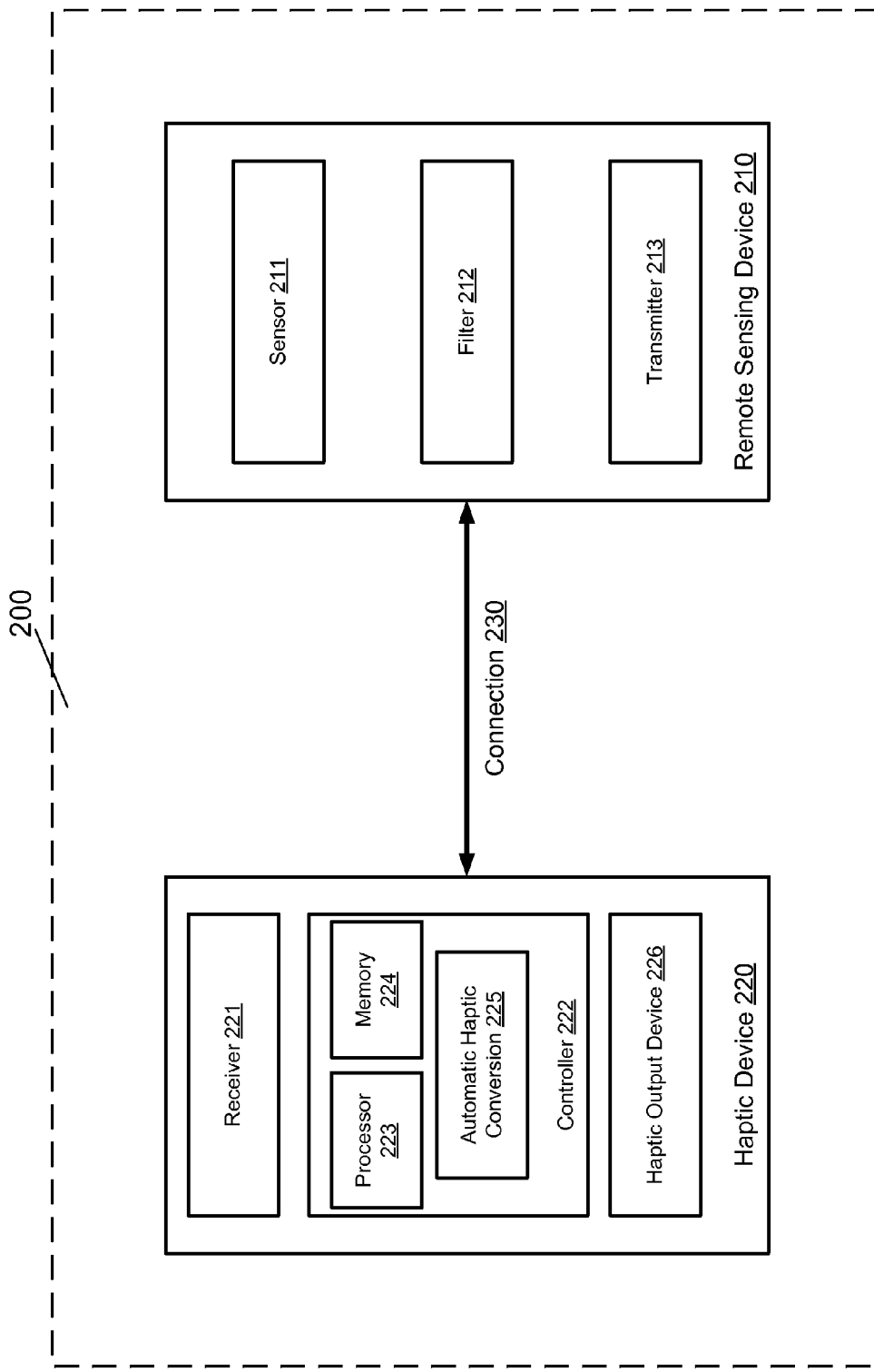
FIG. 2 illustrates a block diagram of a system that automatically converts an input into one or more haptic effects in near real-time, according to an embodiment of the invention.

FIG. 2 illustrates a block diagram of a system 200 that automatically converts an input into one or more haptic effects in near real-time, according to an embodiment of the invention. In accordance with the embodiment, system 200 includes remote sensing device 210 and haptic device 220. Remote sensing device 210 can be operably coupled to haptic device 220 via connection 230. In certain embodiments, connection 230 represents a wireless network connection. In other alternate embodiments, connection 230 represents a wired network connection. Further, in alternate embodiments, system 200 can include one or more additional remote sensing devices in addition to remote sensing device 210 and/or one or more additional haptic devices in addition to haptic device 220 (not illustrated in FIG. 2). In some embodiments, connection 230 can be omitted, and sensing device 210 and haptic device 220 can be housed within a single device of system 200, where sensing device 210 and haptic device 220 can be operably coupled by a bus, or other communication mechanism for communicating information. Further, in some embodiments, haptic device 220 can be a wearable haptic device.

According to the embodiment, remote sensing device 210 includes sensor 211. Sensor 211 is configured to sense input in near real-time. More specifically, sensor 211 is configured to detect input that is generated in proximity of remote sensing device 210 and to convert the detected input into a signal in near real-time. In an alternate embodiment, the sensing of the input is not required to be in real-time or near real-time. Instead, in this alternate embodiment, the input can be buffered in one or more buffers (not illustrated in FIG. 2). In certain embodiments, the input can be an audio signal, or other type of audio input, that includes audio data. In other alternate embodiments, the input can be a video signal, or other type of video input, that includes video data. In yet other alternate embodiments, the input can be an acceleration signal, or other type of acceleration input, that includes acceleration data. In yet other alternate embodiments, the input can be an orientation signal that includes orientation data, an ambient light signal that includes ambient light data, or another type of signal that can be sensed by a sensor. In certain embodiments, sensor 211 can be identical to sensor 30 of FIG. 1.

In embodiments where the input is an audio signal, sensor 211 can be a microphone, or some other type of device configured to sense an audio signal. In embodiments where the input is a video signal, sensor 211 can be a camera or some other type of device configured to sense a video signal. In embodiments where the input is an acceleration signal, sensor 211 can be an accelerometer or some other type of device configured to sense an acceleration signal. In embodiments where the input is a movement signal, sensor 211 can be a pedometer or some other type of device configured to sense a movement signal. In embodiments where the input is a temperature signal, sensor 211 can be a temperature sensor or some other type of device configured to sense a temperature signal. Further, in certain embodiments, remote sensing device 210 can include one or more additional sensors, in addition to sensor 211 (not illustrated in FIG. 2). In some of these embodiments, sensor 211 and the one or more additional sensors may be part of a sensor array (such as a microphone array).

In accordance with the embodiment, remote sensing device 210 optionally includes filter 212. Filter 212 is configured to filter the sensed input. More specifically, filter 212 is configured to filter out certain frequency bands, features, or other characteristics of the sensed input. For example, where the sensed input is an audio signal, or other type of audio input, filter 212 can filter out characteristics of the sensed input that represent background sound, so that the only remaining characteristics of the sensed input represent speech or some other type of sound. As an alternate example, in a scenario where speech is constantly detected, filter 212 can filter out characteristics of the sensed input that represent speech, so that the only remaining characteristics of the sensed input represent background sound. As yet another example, where the sensed input is another type of input, filter 212 can filter out characteristics of the sensed input so as to remove events of small magnitude, and so that the only remaining characteristics of the sensed input represent events of a significant magnitude, such as environment changes, frequency transitions, etc. In certain embodiments, filter 212 can be a high-pass filter. Further, in alternate embodiments, filter 212 can be omitted from remote sensing device 210, and the corresponding filtering can be omitted.

According to the embodiment, remote sensing device 210 further includes transmitter 213. Transmitter 213 is configured to transmit the sensed input to haptic device 220 using connection 230. In embodiments where connection 230 is a wireless connection, transmitter 213 can be a wireless transmitter configured to wirelessly transmit the sensed input to haptic device 220 using the wireless connection. In alternate embodiments where connection 230 is a wired connection, transmitter 213 can be a wired transmitter configured to transmit the sensed input to haptic device 220 using the wired connection. In alternate embodiments, transmitter 213 can be omitted from remote sensing device 210, and the corresponding transmitting can be omitted.

According to the embodiment, haptic device 220 includes receiver 221. Receiver 221 is configured to receive the sensed input that is transmitted from remote sensing device 210 using connection 230. In embodiments where connection 230 is a wireless connection, receiver 221 can be a wireless receiver configured to wirelessly receive the sensed input from remote sensing device 210 using the wireless connection. In alternate embodiments where connection 230 is a wired connection, receiver 221 can be a wired receiver configured to receive the sensed input from remote sensing device 210 using the wired connection. In alternate embodiments, receiver 221 can be omitted from haptic device 210, and the corresponding receiving can be omitted.

In accordance with the embodiment, haptic device 220 further includes controller 222. Controller 222 is configured to automatically convert the sensed input into one or more haptic signals in near-real time. More specifically, controller 222 is configured to receive the sensed input from receiver 221 and to automatically convert the received sensed input into one or more haptic signals in near real-time. In certain embodiments, this means that the sensed input is directly converted into the one or more haptic signals without storing the sensed input in a memory, or some other type of storage. In an alternate embodiment, the conversion of the received sensed input into the one or more haptic signals is not required to be in real-time or near real-time, and can involve storing the sensed input in a memory, or some other type of storage.

Controller 222 can use any haptic conversion algorithm that is known to one or ordinary skill in the relevant art to convert the sensed input into the one or more haptic signals. Example haptic conversion algorithms are described in the following patents or patent applications (all of which are hereby incorporated by reference in their entirety): U.S. Pat. No. 7,979,146; U.S. Pat. No. 8,000,825; U.S. Pat. No. 8,378,964; U.S. Pat. App. Pub. No. 2011/0202155; U.S. Pat. App. Pub. No. 2011/0215913; U.S. Pat. App. Pub. No. 2012/0206246; U.S. Pat. App. Pub. No. 2012/0206247; U.S. patent application Ser. No. 13/439,241; U.S. patent application Ser. No. 13/661,140; U.S. patent application Ser. No. 13/743,540; U.S. patent application Ser. No. 13/767,129; U.S. patent application Ser. No. 13/785,166; U.S. patent application Ser. No. 13/788,487; U.S. patent application Ser. No. 13/803,778; and U.S. patent application Ser. No. 13/799,059.

In some embodiments, controller 222 can further identify and/or extract one or more frequency bands, features, or characteristics of the sensed input. Examples of the characteristics can include: amplitude, frequency, duration, envelope, density, magnitude, and strength. A characteristic can include a numeric value, where the numeric value can define a characteristic of the sensed input. Controller 222 can further modify the one or more haptic signals based on the one or more identified characteristics. More specifically, controller 222 can modify one or more haptic parameters of the one or more haptic signals to match the one or more identified characteristics. According to the embodiment, a haptic signal can include one or more haptic parameters, where a haptic parameter is a parameter that can define the haptic signal used to generate a haptic effect, and thus, can also define the haptic effect to be generated. More specifically, a haptic parameter is a quantity of a haptic effect quality, such as magnitude, frequency, duration, amplitude, strength, envelope, density, or any other kind of quantifiable haptic parameter. According to the embodiment, a haptic effect can be defined, at least in part, by the one or more haptic parameters of the haptic signal, where the one or more haptic parameters can define characteristics of the haptic effect. A haptic parameter can include a numeric value, where the numeric value can define a characteristic of the haptic signal, and thus, can also define a characteristic of the haptic effect generated by the haptic signal. Examples of haptic parameters can include: an amplitude haptic parameter, a frequency haptic parameter, a duration haptic parameter, an envelope haptic parameter, a density haptic parameter, a magnitude haptic parameter, and a strength haptic parameter.

As an example, controller 222 can identify and/or extract one or more specific frequency bands within an audio signal, or other type of audio input. Controller 222 can then modify one or more haptic parameters of a generated haptic signal, so that the haptic signal includes one or more specific frequency bands that are identical or similar to the identified frequency bands within the audio signal, or other type of audio input. As is described below in greater detail, the modified haptic signal can then be used to generate one or more distinctive haptic effects, where the distinctive haptic effects can identify the audio signal/input.

As another example, controller 222 can identify and/or extract a time and/or frequency signature from an audio input. Controller 222 can then modify one or more haptic parameters of a generated haptic signal, so that the haptic signal includes a time and/or frequency signature that is identical or similar to the identified time and/or frequency signature within the audio input. As is described below in greater detail, the modified haptic signal can then be used to generate one or more distinctive haptic effects, where the distinctive haptic effects can identify the audio input. In one particular example, the audio input may be a type of bird call, and the time and/or frequency signature within the bird call can uniquely identify the type of bird call. Thus, the modified haptic signal may be used to generate a haptic effect that identifies the type of bird call based on the corresponding time and/or frequency signature of the modified haptic signal. In another particular example, the audio input may include human activity and non-human activity (such as human speech and vehicle noise), and the identified characteristics within the audio input may uniquely identify the human activity as distinguished from the non-human activity. Thus, the modified haptic signal may be used to generate a first haptic effect that identifies the human activity, and a second haptic effect that identifies the non-human activity. An individual that experiences both the first haptic effect and second haptic effect can identify that the first haptic effect identifies human activity, and the second haptic effect identifies non-human activity.

Further, in an alternate embodiment, rather than automatically converting the sensed input into one or more haptic signals, controller 222 can select one or more haptic signals that are stored within controller 222 based on the one or more identified characteristics of the sensed input. More specifically, controller 222 can select one or more haptic signals that include one or more haptic parameters that are identical or most similar to the one or more identified characteristics of the sensed input. The one or more haptic signals can be stored within a library, where the library is stored within controller 222.

According to the illustrated embodiment, controller 222 can include processor 233, memory 224 and automatic haptic conversion module 225. Processor 233 may be any type of general or specific purpose processor. In certain embodiments, processor 233 can be identical to processor 22 of FIG. 1. Memory 224 can be configured to store information and instructions to be executed by processor 233. Memory 224 can be comprised of any combination of RAM, ROM, static storage such as a magnetic or optical disk, or any other type of computer-readable medium. In certain embodiments, memory 224 can be identical to memory 14 of FIG. 1. Automatic haptic conversion module 225 can be configured to perform the aforementioned functionality for automatically converting an input into one or more haptic effects. In certain embodiments, automatic haptic conversion module 225 can comprise a plurality of modules, where each module provides a specific individual portion of the aforementioned functionality for automatically converting an input into one or more haptic effects. Further, in certain embodiments, automatic haptic conversion module 225 is identical to automatic haptic conversion module 16 of FIG. 1.

Also according to the embodiment, haptic device 220 further includes haptic output device 226. Controller 222 is configured to send the one or more haptic signals to haptic output device 226. In turn, haptic output device 226 is configured to output one or more haptic effects, such as vibrotactile haptic effects, electrostatic friction haptic effects, or deformation haptic effects, in response to the one or more haptic signals sent by controller 222. In certain embodiments, haptic output device 226 is identical to actuator 26 of FIG. 1.

Figure 3:
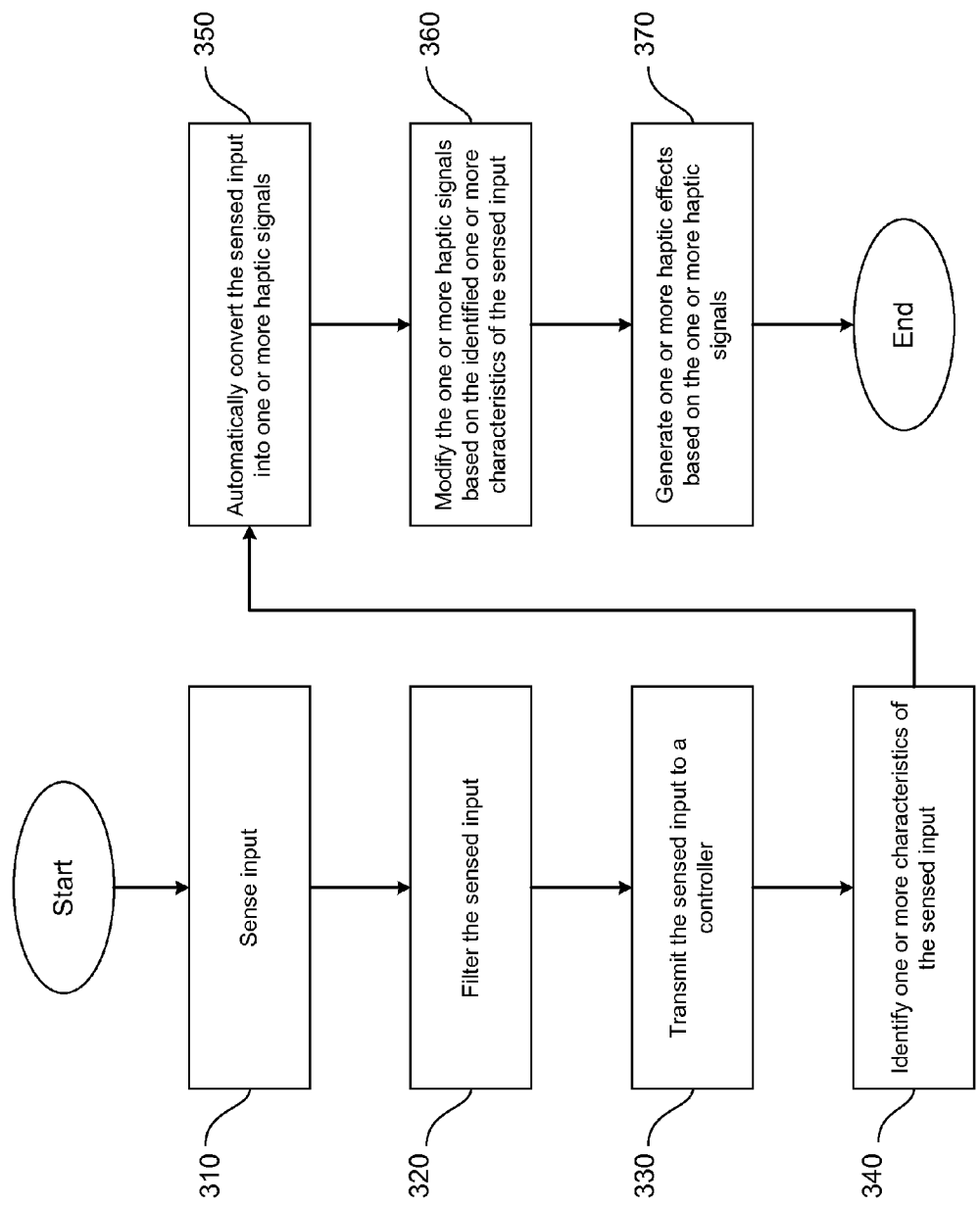
FIG. 3 illustrates a flow diagram of the functionality of an automatic haptic conversion module, according to one embodiment of the invention.

FIG. 3 illustrates a flow diagram of the functionality of an automatic haptic conversion module (such as automatic haptic conversion module 16 of FIG. 1, and automatic haptic conversion module 225 of FIG. 2), according to one embodiment of the invention. In one embodiment, the functionality of FIG. 3 is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 310. At 310, input is sensed. In certain embodiments, the input can be sensed in near-real time. Further, in certain embodiments, the input can include audio data. In other embodiments, the input can include video data. In other embodiments, the input can include acceleration data. In other embodiments, the input can include another type of data. The flow then proceeds to 320.

At 320, the sensed input is filtered. In certain embodiments, 320 can be omitted. The flow then proceeds to 330.

At 330, the sensed input is transmitted to a controller. In some embodiments, the sensed input can be wirelessly transmitted to the controller. In certain embodiments, 330 can be omitted. The flow then proceeds to 340.

At 340, one or more characteristics of the sensed input are identified. In certain embodiments, the one or more characteristics of the sensed input can include at least one of: an amplitude, a frequency, a duration, an envelope, a density, a magnitude, or a strength. In certain embodiments, 340 can be omitted. The flow then proceeds to 350.

At 350, the sensed input is automatically converted into one or more haptic signals. The sensed input can be automatically converted into the one or more haptic signals using a haptic conversion algorithm. In certain embodiments, the sensed input can be automatically converted into the one or more haptic signals in near real-time. The flow then proceeds to 360.

At 360, the one or more haptic signals are modified based on the one or more identified characteristics of the sensed input. In certain embodiments, one or more haptic parameters of the one or more haptic signals can be modified to match the one or more identified characteristics of the sensed input. In some of these embodiments, the one or more haptic parameters can include at least one of: an amplitude haptic parameter, a frequency haptic parameter, a duration haptic parameter, an envelope haptic parameter, a density haptic parameter, a magnitude parameter, or a strength haptic parameter. In certain embodiments, 360 can be omitted. The flow then proceeds to 370.

At 370, one or more haptic effects are generated based on the one or more haptic signals. In certain embodiments, the one or more haptic signals can be sent to one or more haptic output devices to generate the one or more haptic effects. In some of these embodiments, at least one of the one or more haptic output devices is an actuator. Further, in certain embodiments, a wearable haptic device can generate the one or more haptic effects based on the one or more haptic signals. The flow then ends.

Thus, according to an embodiment, a system is provided that automatically converts sensed input, such as audio signals, into haptic effects, where the sensing of the input and the automatic conversion is performed in near real-time. Thus, the system can automatically generate haptic content from other input, such as audio signals. Thus, the system can make it significantly easier to create haptic content.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to convert an input into one or more haptic effects in near real-time, the automatic converting comprising:

sensing the input by a sensor in near-real time as it is being generated by a source and with a first time delay associated with the sensing of the input by the sensor;

automatically converting the sensed input into one or more haptic signals in near-real time as it is being received for the automatically converting and with a second time delay associated with the automatically converting;

modifying a haptic parameter of the one or more haptic signals to have substantially a same numeric value as a parameter of the sensed input, wherein the haptic parameter and the parameter of the sensed input are of a same parameter type, wherein the same parameter type is at least one of an amplitude, a frequency, a duration, an envelope, a density, a magnitude, a time signature, a frequency signature, a frequency band, or a strength; and generating the one or more haptic effects based on the one or more haptic signals.

2. The computer-readable medium of claim 1, wherein the automatically converting further comprises:

identifying one or more characteristics of the sensed input; and modifying the one or more haptic signals based on the one or more identified characteristics.

3. The computer-readable medium of claim 2, wherein the modifying the one or more haptic signals further comprises:

modifying the one or more haptic signals to include the one or more identified characteristics of the sensed input.

4. The computer-readable medium of claim 3, wherein the one or more characteristics of the sensed input comprises at least one of: an amplitude, a frequency, a duration, an envelope, a density, a magnitude, a time signature, a frequency signature, or a strength; and wherein the one or more haptic parameters of the one or more haptic signals comprises at least one of: an amplitude haptic parameter, a frequency haptic parameter, a duration haptic parameter, an envelope haptic parameter, a density haptic parameter, a magnitude parameter, a time signature haptic parameter, a frequency signature haptic parameter, or a strength haptic parameter.

5. The computer-readable medium of claim 1, wherein the automatically converting further comprises:

filtering the sensed input.

6. The computer-readable medium of claim 1, wherein the automatically converting further comprises:

wirelessly transmitting the sensed input to a controller configured to perform the automatically converting.

7. The computer-readable medium of claim 1, wherein the generating the one or more haptic effects is performed by a wearable haptic device.

8. The computer-readable medium of claim 1, wherein the generating the one or more haptic effects further comprises:

sending the one or more haptic signals to one or more haptic output devices to generate the one or more haptic effects.

9. The computer-readable medium of claim 8, wherein at least one haptic output device of the one or more haptic output devices comprises an actuator.

10. The computer-readable medium of claim 1, wherein the input comprises audio data.

11. The computer-readable medium of claim 1, wherein the input comprises video data.

12. The computer-readable medium of claim 1, wherein the input comprises acceleration data.

13. A computer-implemented method for converting an input into one or more haptic effects in near real-time, comprising:

sensing the input by a sensor in near-real time as it is being generated by a source and with a first time delay associated with the sensing of the input by the sensor;

automatically converting the sensed input into one or more haptic signals in near-real time as it is being received for the automatically converting and with a second time delay associated with the automatically converting;

modifying a haptic parameter of the one or more haptic signals to have substantially a same numeric value as a parameter of the sensed input, wherein the haptic parameter and the parameter of the sensed input are of a same parameter type, wherein the same parameter type is at least one of an amplitude, a frequency, a duration, an envelope, a density, a magnitude, a time signature, a frequency signature, a frequency band, or a strength; and generating the one or more haptic effects based on the one or more haptic signals.

14. The computer-implemented method of claim 13, further comprising:

identifying one or more characteristics of the sensed input; and modifying the one or more haptic signals based on the one or more identified characteristics.

15. The computer-implemented method of claim 14, wherein the modifying the one or more haptic signals further comprises:

modifying the one or more haptic signals to include the one or more identified characteristics of the sensed input.

16. The computer-implemented method of claim 15, wherein the one or more characteristics of the sensed input comprises at least one of: an amplitude, a frequency, a duration, an envelope, a density, a magnitude, a time signature, a frequency signature, or a strength; and wherein the one or more haptic parameters of the one or more haptic signals comprises at least one of: an amplitude haptic parameter, a frequency haptic parameter, a duration haptic parameter, an envelope haptic parameter, a density haptic parameter, a magnitude parameter, a time signature haptic parameter, a frequency signature haptic parameter, or a strength haptic parameter.

17. The computer-implemented method claim 13, wherein the automatically converting further comprises:

filtering the sensed input.

18. A system for converting an input into one or more haptic effects in near real-time, comprising:

a memory configured to store an automatic haptic conversion module; and a processor configured to execute the automatic haptic conversion module stored on the memory;

wherein the automatic haptic conversion module is configured to sense the input by a sensor in near-real time as it is being generated by a source and with a first time delay associated with sensing the input by the sensor;

wherein the automatic haptic conversion module is further configured to automatically convert the sensed input into one or more haptic signals in near-real time as it is being received for automatically converting and with a second time delay associated with the automatically converting;

wherein the automatic haptic conversion module is further configured to modify a haptic parameter of the one or more haptic signals to have substantially a same numeric value as a parameter of the sensed input, wherein the haptic parameter and the parameter of the sensed input are of a same parameter type, wherein the same parameter type is at least one of an amplitude, a frequency, a duration, an envelope, a density, a magnitude, a time signature, a frequency signature, a frequency band, or a strength; and wherein the automatic haptic conversion module is further configured to generate the one or more haptic effects based on the one or more haptic signals.

19. The system of claim 18, wherein the automatic haptic conversion module is further configured to identify one or more characteristics of the sensed input; and wherein the automatic haptic conversion module is further configured to modify the one or more haptic signals based on the one or more identified characteristics.

20. The system of claim 19, wherein the automatic haptic conversion module is further configured to modify the one or more haptic signals to include the one or more identified characteristics of the sensed input.

21. The system of claim 20, wherein the one or more characteristics of the sensed input comprises at least one of: an amplitude, a frequency, a duration, an envelope, a density, a magnitude, a time signature, a frequency signature, or a strength; and wherein the one or more haptic parameters of the one or more haptic signals comprises at least one of: an amplitude haptic parameter, a frequency haptic parameter, a duration haptic parameter, an envelope haptic parameter, a density haptic parameter, a magnitude parameter, a time signature haptic parameter, a frequency signature haptic parameter, or a strength haptic parameter.

22. The system of claim 18, wherein the automatic haptic conversion module is further configured to filter the sensed input.

* * * * *